US011221947B2

(12) United States Patent
Kennke et al.

(10) Patent No.: US 11,221,947 B2
(45) Date of Patent: Jan. 11, 2022

(54) CONCURRENT GARBAGE COLLECTION WITH MINIMAL GRAPH TRAVERSAL

(71) Applicant: RED HAT, INC., Raleigh, NC (US)

(72) Inventors: Roman Kennke, Freiburg (DE); Christine H. Flood, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 154 days.

(21) Appl. No.: 16/047,991

(22) Filed: Jul. 27, 2018

(65) Prior Publication Data
US 2020/0034288 A1 Jan. 30, 2020

(51) Int. Cl.
*G06F 12/02* (2006.01)

(52) U.S. Cl.
CPC .. *G06F 12/0253* (2013.01); *G06F 2212/1044* (2013.01)

(58) Field of Classification Search
USPC .......................................................... 707/816
See application file for complete search history.

(56) References Cited

U.S. PATENT DOCUMENTS

| | | | |
|---|---|---|---|
| 6,339,779 B1* | 1/2002 | Houldsworth | ...... G06F 12/0261 |
| 6,487,563 B1* | 11/2002 | Houldsworth | ...... G06F 12/0269 |
| 7,685,182 B2 | 3/2010 | Dussud | |
| 8,769,230 B2 | 7/2014 | Burka | |
| 9,229,858 B2 | 1/2016 | Flood | |
| 9,971,632 B2 | 5/2018 | O'Meara | |
| 2014/0047209 A1* | 2/2014 | Pizlo | ................... G06F 11/3452 711/173 |

OTHER PUBLICATIONS

Azul Systems, Azul Pauseless Garbage Collection; Providing continuous, pauseless operation for Java applications, 2014 Azul Systems, Inc. Sunnyvale California, USA https://www.azul.com/files/wp_pgc_zing_v52.pdf.
Memory Management in Java; 2014. https://wuciawe.github.io/java/2014/09/09/memory-management-in-java.html.
Concurrent Mark; IBM Knowledge Center https://www.ibm.com/support/knowledgecenter/en/SSYKE2_8.0.0/com.ibm.java.vm.80.doc/docs/mm_gc_mark_concurrent.html (last accessed Jun. 4, 2018).
Getting Started with the G1 Garbage Collector; Michael J. Williams; Oracle http://www.oracle.com/technetwork/tutorials/tutorials-1876574.html (last accessed Jun. 4, 2018).

\* cited by examiner

*Primary Examiner* — Hung T Vy
(74) *Attorney, Agent, or Firm* — Haynes and Boone, LLP

(57) ABSTRACT

Systems and techniques for garbage collection are disclosed for concurrently performing a garbage collection cycle in a single traversal of a garbage collection heap while application threads are running. The garbage collection cycle includes marking a first memory object as live. The garbage collection cycle also includes determining that a forwarding pointer of the first memory object points to the first memory object. The garbage collection cycle further includes evacuating the first memory object to a free region based on the determining. The garbage collection cycle additionally includes evacuating a second memory object in the same single traversal of the garbage collection heap in which the first memory object is being marked live.

21 Claims, 5 Drawing Sheets

CONCURRENT GARBAGE COLLECTION WITH MINIMAL GRAPH TRAVERSAL

FIELD OF DISCLOSURE

The present disclosure generally relates to memory management, and more particularly to garbage collection (GC).

BACKGROUND

Garbage collection may refer to a process of increasing the amount of usable memory in a computer system by clearing unused objects from memory. Garbage collection is performed by garbage collectors, which reclaim garbage or memory occupied by objects that are no longer in use by a program. Memory may be allocated to a stack, which is used for static memory allocation, or to a heap, which is used for dynamic memory allocation. Memory allocated to the heap will reside in the heap for as long as the program which allocated the memory is running, and heap memory can dynamically change state based on allocations and deallocations. Garbage collectors may be used to automatically manage the deallocated memory under various garbage collection schemes.

SUMMARY

A system of one or more computers can perform particular operations or actions by virtue of having software, firmware, hardware, or a combination thereof installed on the system that in operation causes or cause the system to perform the actions. One or more computer programs can perform particular operations or actions by virtue of including instructions that, when executed by data processing apparatus, cause the apparatus to perform the actions. One general aspect includes a method including: while application threads are running, performing a current garbage collection cycle in a single traversal of a garbage collection heap, the current garbage collection cycle including: marking a first memory object as live; determining that a forwarding pointer of the first memory object points to the first memory object; evacuating the first memory object to a free region based on the determining; and evacuating a second memory object in the same single traversal of the garbage collection heap in which the first memory object is being marked live.

One general aspect includes a computing system including: a non-transitory memory storing a code coverage module; one or more hardware processors coupled to the non-transitory memory and that execute instructions to cause the system to perform operations comprising: while application threads are running, performing a current garbage collection cycle in a single traversal of a garbage collection heap, the current garbage collection cycle comprising: marking a first memory object as live; determining that a forwarding pointer of the first memory object points to the first memory object; evacuating the first memory object to a free region based on the determining; and evacuating a second memory object in the same single traversal of the garbage collection heap in which the first memory object is being marked live.

One general aspect includes a non-transitory machine-readable medium having stored thereon machine-readable instructions executable to cause a machine to perform operations including: while application threads are running, perform garbage collection of a running application in a single traversal of a garbage collection heap wherein the following steps performed concurrently with one another: receiving, from a work queue, memory objects located in the evacuation region, the evacuation region being pre-selected based on liveness information obtained during a prior garbage collection cycle; marking the identified memory objects as live; determining that forwarding pointers of the marked memory objects point to the marked memory objects; copying the marked memory objects in the evacuation region to a free region; pointing the forwarding pointers of the marked memory objects to the copies of the marked memory objects in the free region; updating the references pointing to the copied memory objects in the evacuation region to point instead to the copies of the copied memory objects in the free region; placing the marked memory objects in the work queue.

DETAILED DESCRIPTION

Figure 1:
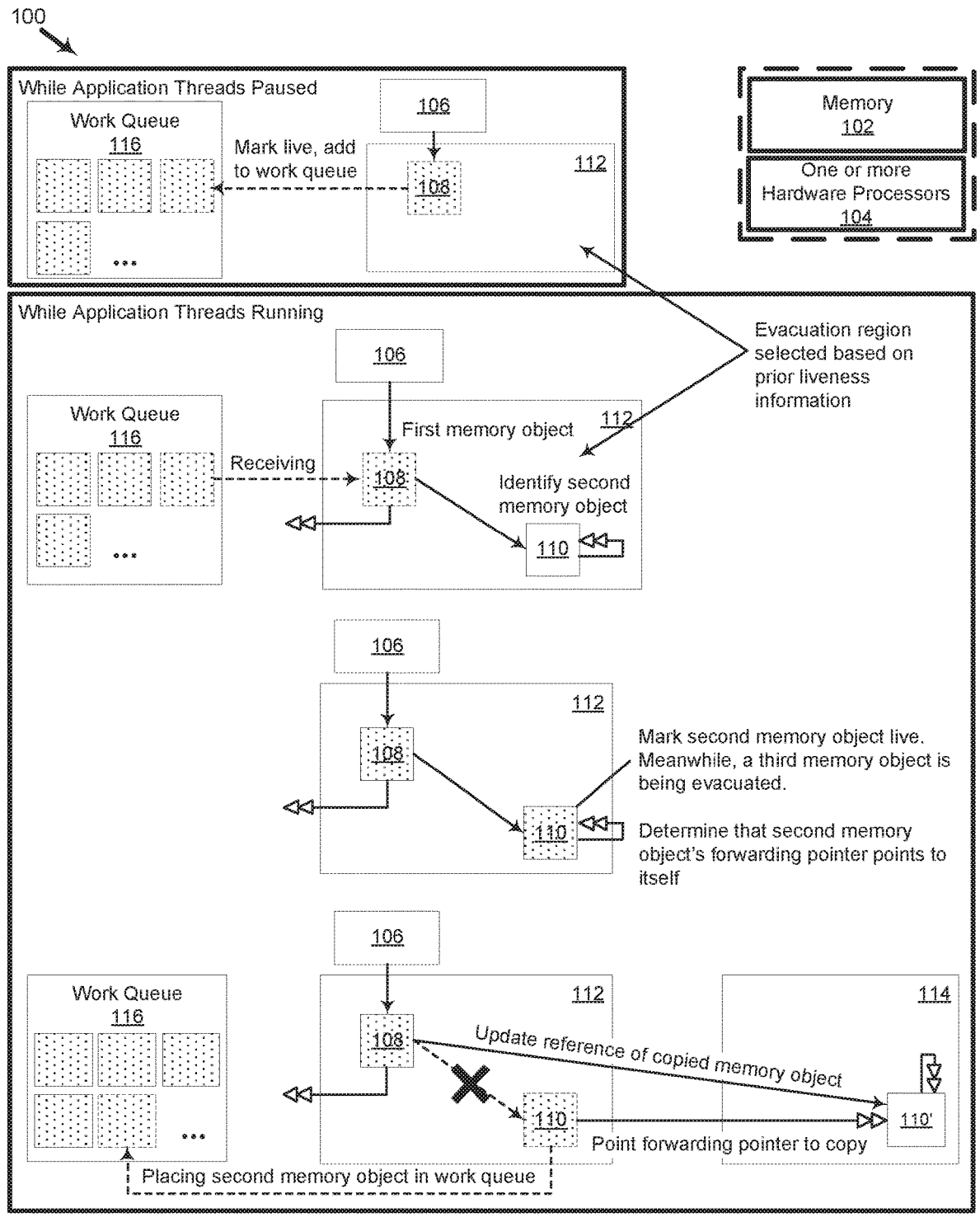
FIG. 1 is an organizational diagram illustrating a system to perform concurrent garbage collection while application threads are running, in accordance with various examples of the present disclosure.

This disclosure relates to memory management, and more particularly to garbage collection. Methods, systems, and instructions stored on computer-readable media for performing garbage collection while threads of an application are running are disclosed.

Garbage collection may proceed by reclaiming memory in several disjoint phases. For example, a first phase may find and mark memory objects that are in use or live. A second phase may copy live memory objects to a new memory location. A third phase may update any references to the copied memory objects such that they point to the new location. At each phase, the garbage collection heap, or at least parts of it, may need to be traversed, resulting in multiple traversals of the heap to complete a garbage collection cycle. In other words, garbage collection can be time and resource intensive. To reduce the time and resources spent in garbage collection, some garbage collectors use short pauses between phases, while others stop the applications for longer times so that entire phases may be executed without pausing. However, both approaches still require multiple passes over the heap, which increases the number of memory accesses and pollutes caches. In some examples, the garbage collection heap includes dynamic memory allocated to the heap. In some examples, the garbage collection heap includes static memory allocated to the stack. In some examples, the garbage collection heap includes both dynamic and static memory allocated to the heap and to the stack.

In some examples, the three disjoint phases may be combined into a single phase requiring only a single traversal of live objects in the heap, thus reducing the time and resources spent in garbage collection. For example, traversing the live objects in the heap only once reduces the number of memory accesses required to perform garbage collection. Additionally, the described techniques also improve throughput and reduce latency by using only very brief pauses before and after each garbage collection cycle. Garbage collection is further sped up by the use of multiple garbage collection worker threads to perform the garbage collection tasks, putting to bear the processing power of multiple CPUs, CPU cores, or CPU threads to garbage collection.

In particular, rather than performing garbage collection in the three distinct phases discussed above, example techniques may concurrently identify live objects, concurrently mark the objects as live, concurrently copy the live objects, and concurrently re-reference the live objects while the application threads are running. For example, after an initial scan of garbage collection roots, the disclosed techniques of identifying, marking, copying, and re-referencing memory objects may be performed in parallel, or concurrent to one another. For example, with respect to different memory objects, while a memory object is being discovered or identified (e.g., from a root reference), other memory objects are also being marked, copied, and/or re-referenced. Also, while one memory object is being marked, another memory object may be copied and/or re-referenced without having to wait for the first memory object's marking to be complete. And with respect to the same memory object, while the memory object is being marked, the same memory object that is being marked may also be copied to an unused region of memory without having to wait for the marking to be complete. Thus, some or all of steps of the identifying, marking, copying, and re-referencing may occur simultaneously or concurrently with respect to the same object or with respect to different objects. Other permutations and combinations of identifying, marking, copying, and re-referencing are also possible.

By performing the steps of identifying, marking, copying, and re-referencing concurrently with one another and also concurrently with the running of the application (e.g., while the application threads are running), resulting in a "double concurrency," the time required for garbage collection is greatly reduced as compared to performing the same steps in distinct phases. Even if the phased steps were performed "concurrently" with the running of the application, the time savings would not be as significant since only a "single concurrency" is achieved, i.e., the phases are not being performed concurrently with one another while the application is running.

In some examples, the overall process of garbage collection may be made even more efficient by using previous liveness information to select evacuation regions before complete marking data is obtained. In such examples, the heap, which is an area of memory used for dynamic allocations, is divided into multiple regions. The regions may be equally or differently sized. A region may contain newly allocated objects, long lived objects, or a mix of both. Any region may be selected for garbage collection, and the selection may be based on one or more criteria. One such criterion may be the liveness of a region, which may be expressed by the percentage of objects in the region that are newly allocated. For example, if Region A contains 10% newly allocated objects and 90% long-lived objects, the liveness of the region is 10%. The threshold for the region to be selected for evacuation may, for example, be 40% liveness and lower. Thus in this particular example, since the liveness of Region A is 10%, region A would be selected for evacuation since its liveness is below the 40% threshold.

In some examples where the garbage collection tasks are not being performed concurrently (e.g., in garbage collection schemes where the evacuation phase begins only after all the objects have been completely marked in a marking phase), the selection of regions for evacuation may be based on current liveness information, e.g., a percentage, size, number, density, ratio, etc., of objects in the region that have been marked live during that particular garbage collection cycle. An advantage of using current liveness information to select garbage collection regions is that garbage collection resources can be accurately marshaled toward the regions which are currently known to require garbage collection. However, acquiring current liveness information costs more time and resources upfront, since the marking data for the current garbage collection cycle needs to first be collected and analyzed. This delays evacuation, and increases the total time for garbage collection.

To address the abovementioned disadvantages of using current liveness information, the selection of garbage collection regions may instead be based on past liveness information, e.g., liveness information obtained in a previous traversal of a garbage collection heap or obtained or derived from a previous garbage collection cycle. Using previous liveness information may speed up garbage collection, since the garbage collector may base its evacuation decision on already available liveness data instead of waiting for the marking to be completed before proceeding to evacuate the region. In other words, using past liveness information allows marking and evacuation to proceed concurrently, since there is no longer any need to wait for marking of all objects in a region to be complete before proceeding with evacuation. But since the liveness information is not current, the garbage collector may over- or under-evacuate, thereby causing more resources to be used than optimal or intended. For example, based on previous liveness information, Region A may be 41% live and therefore not be selectable for evacuation (assuming an evacuation criterion of below-40% liveness). However, during the current garbage collection cycle, Region B's objects may decay, become dereferenced, or otherwise lose their liveness to cause Region B to become 39% live. Thus, based on current liveness (39%), Region B should have been selected. However, because prior liveness (41%) was used, Region B was not selected.

To overcome this shortcoming of using past liveness information, a garbage collector may consider how liveness has changed in the past to predict how liveness will change between a previous garbage collection cycle and a current one. For example, based on an analysis of liveness data from previous garbage collection cycles, a garbage collector may determine at a 99% confidence level that liveness does not decrease by more than 5% between garbage collection cycles. Thus, if previous liveness information indicated that a particular region was below 45% in a prior cycle, deciding to perform garbage collection on such regions in the current garbage collection cycle would, statistically speaking, save computing resources even if over-collections do happen from time to time. Other statistical methods besides confidence intervals may be used. In some examples, artificial intelligence training sets and decision trees may be used to train the garbage collector to more accurately predict how liveness will change between garbage collection cycles.

The techniques described herein improve the functioning of the computer by making garbage collection more efficient. In particular, they improve the cost-benefit tradeoff of garbage collection. For example, performing each of the garbage collection steps with "double concurrency"—concurrently with one another and concurrently with the running of the application threads—improves the functioning of the computer as it results in shorter garbage collection cycles and shorter application pause times, since almost all of the garbage collection steps are performed while the application threads are running. As another example, the technique of using prior liveness information further improves the speed and pause times of garbage collection, since the garbage collector can base its selection decision on information that is already at hand rather than having to wait for current information. As a result of applying these techniques, a test garbage collector was able to perform garbage collection for a 100 gigabyte heap with 80 gigabytes of live data with a total pause time in the 1 millisecond range (i.e., less than 5 milliseconds, 10 milliseconds or 100 milliseconds) and a total garbage collection cycle time in the 1500 millisecond range (i.e., less than 5000 milliseconds, 10,000 milliseconds, or 100,000 milliseconds).

FIG. 1 is an organizational diagram illustrating a system 100 system to perform concurrent garbage collection while application threads are running, in accordance with various examples of the present disclosure.

The system 100 includes memory 102 and one or more hardware processors 104. The memory 102 may be a non-transitory memory. The memory 102 may be structured to include at least one machine-readable storage medium on which is stored one or more set of instructions (e.g., software) including any one or more of the methodologies or functions described herein. The memory 102 may be structured to include one or more of a read-only memory (ROM), flash memory, dynamic random access memory (DRAM) such as synchronous DRAM (DFRAM), double data rate (DDR SDRAM), or DRAM (RDRAM), and so forth, static memory (e.g., flash memory, static random access memory (SRAM), and so forth), and a data storage device (e.g., a hard disk drive (HDD), solid state drive (SSD), and so forth). Accordingly, any of the operations, steps, and actions of the methods described herein may be implemented using corresponding machine-readable instructions stored on or in the memory 102 that are executable by the hardware processor 104.

In more detail regarding the hardware processor 104, the hardware processor 104 is structured to include one or more general-purpose processing devices such as a microprocessor, central processing unit (CPU), and the like. More particularly, the hardware processor 104 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the hardware processor 104 is structured to include one or more special-purpose processing devices such as an application specific integrated circuit (ASIC), a field programmable gate array (FPGA), a digital signal processor (DSP), network processor, and so forth. The hardware processor executes instructions for performing the operations, steps, and actions discussed herein.

The memory 102 is structured to store garbage collection roots 106. Garbage collection roots 106 include local variables, active threads, static variables, and native code references. Roots 106 may reference memory objects, such as memory object 108, and those objects may in turn reference other objects (e.g., second memory object 110), forming a network of objects which may be known as an "object tree" or "object graph." However, at the root of every object tree or object graph are one or more roots, such as garbage collection roots 106. Objects which are reachable from the roots 106 may be considered reachable or live objects, while non-reachable objects may be considered garbage. For example, object 108 is a live object because it is referenced by roots 106 (depicted by the arrow pointing from roots 106 to object 108).

As explained above, a garbage collector may concurrently perform the main garbage collection tasks of marking, copying, and re-referencing an object in a garbage collection cycle. Pauses may also be introduced before and after these tasks, for example, to scan the garbage collection roots. FIG. 1 illustrates an example of tasks that may be performed while an application is paused, and an example of the main garbage collection tasks that may be performed while the application is running. Just as one example, FIG. 1 shows that while the application threads are paused, a memory object 108 may be marked live and added to a work queue 116. For further illustrations and discussion of the actions that may be performed while the application threads are paused, refer to FIGS. 3 and 4. Turning to the concurrent garbage collection cycle performed while the application threads are running, FIG. 1 shows that the memory object 108 which had been previously marked live is retrieved from the work queue 116 for further processing by garbage collection processes. Garbage collection processes may be, for example, separate threads of the garbage collector that can perform garbage collection tasks. A multi-threaded CPU may be able to use multiple garbage collection processes or threads to perform multiple garbage collection tasks in parallel. The memory object 108 is stored in a memory region. In some examples, the memory region in which the memory object 108 is stored is an evacuation region 112. Other types of regions include free regions which are unpopulated by memory objects and occupied regions which are populated by at least one memory object. One exemplary way in which a free region may become an occupied region is when the free region becomes allocated to store memory objects, i.e., when the free region becomes an allocation region and subsequently stores memory objects. Upon storing the first memory object, the allocation region becomes an occupied region. The difference between an allocation region and an occupied region may, for example, be that the allocation region is actively being allocated new objects, while an occupied region is not. Another difference, for example, may be that the allocation region still has the capacity to store more new objects, while an occupied region does not.

As more objects are stored in the allocation region, the allocation region, which may have a fixed size of say, 100 megabytes, starts to fill up. Some of the objects in the allocation region may be newly allocated objects, and some of the objects may be long-lived objects. The liveness of the allocation region, or of any region in general, may be measured in several ways. For example, one measurement could be a percentage by count of newly allocated objects, i.e., dividing the number of all newly allocated objects by the total number of objects in the region. Another measurement could be a percentage by size of newly allocated objects, i.e., dividing the total size of all newly allocated objects by the total size of all objects in the region or to the size of the region itself. A further measurement could be a percentage by size or number of live objects, calculated in similar fashion. For example, liveness may be calculated by dividing the size of all live objects by the total size of all objects in the region or to the size of the region itself. While a handful of examples are described here, other measurements of liveness may be used.

As described earlier, the liveness of a region may be used to determine whether a region should be evacuated or not. For example, a rule could be set up that flags a memory region for evacuation if liveness is above a threshold, below a threshold, or at a threshold. Other examples include triggering an evacuation when liveness rises from a figure below a threshold to a figure at or above a threshold, dips from a figure above a threshold to a figure at or below a threshold. As an example, the threshold may be a dip-below threshold of 40%. A region may contain 20% newly allocated objects, 20% previously allocated or long-lived objects, and be 60% empty. Using a simple below-40% threshold rule, garbage collection would be performed in this region. However, garbage collection may be premature in such a case, since sufficient empty space exists which could be allocated to new objects that would cause the threshold to be exceeded. For example, 60% of the empty blocks in the region could be allocated to new objects in the region during the current garbage collection cycle, causing the region to have 80% newly allocated objects and 20% previously allocated objects. Also, even if the empty blocks in the region were not allocated in the current garbage cycle but in the next garbage collection cycle, i.e., the region would then be 60% newly allocated and 40% previously allocated. To take into account such situations where sufficient free space exists that could cause a threshold to be broken, a rise-above or dip-below threshold rule may be used instead. However, such situations may be prevented from occurring in the first place, if for example a rule is put in place to prevent the allocation of new objects to evacuation regions, or to only allocate new objects to free regions. With such rules in place, the liveness of evacuation regions only ever decreases.

In addition to the different types of thresholds for liveness, the garbage collector may also be programmed to use prior liveness information, i.e., liveness information obtained from a prior traversal of the garbage collection heap or from a prior garbage collection cycle, to determine an evacuation region for the current garbage collection cycle. For example, after a previous garbage collection cycle, Region A may be determined to be 25% live; Region B, 95% live; and Region C, 5% live. Thus, based on their prior liveness information, the garbage collector may determine that Regions A and C should be evacuated in the current garbage collection cycle (assuming a liveness threshold of below 40%) without needing to calculate the percentage of live objects in Regions A and C in the current garbage collection cycle. This means that evacuation may proceed without first marking any objects in Regions A and C in the current garbage collection cycle. However, in some examples, the garbage collector may use prior liveness information only to prioritize which regions it should begin marking first, with the evacuation decision still based on the current liveness information. For example, the evacuation decision may be made after it has completed marking all the objects in the prioritized region, or after having marked sufficient objects in the prioritized region to cross the evacuation or liveness threshold. In cases where current liveness information is used, the garbage collector may not be able to concurrently evacuate and mark objects.

The example above about Regions A, B, C also indicate that a region may still be below the garbage collection threshold even after a prior garbage collection cycle has ended. This may be because the garbage collection cycle was paused or interrupted, or that there was insufficient time for the garbage collection to completely process all of the live objects in the memory region. In such instances, using prior liveness information makes sense. Also, as earlier explained, using prior liveness information saves time because it allows evacuating, i.e., copying, updating forwarding pointers, and re-referencing steps to occur concurrently with the marking step, since the garbage collector does not have to wait for the marking to be completed before deciding to evacuate (i.e., copy out and re-reference) the objects in the region.

Concurrent receiving, identifying, marking, and evacuating is illustrated in FIG. 1. For example, while a first object 108 is being loaded or received from the work queue 116 by the garbage collection processes, a third object (not illustrated) may be undergoing a first stage of evacuation, e.g., being copied to a free region 114. Similarly, while the second object 110 is being identified from references of the first object 108, the third object may be undergoing a second stage of evacuation, e.g., pointing the third object's forwarding pointers (illustrated by double-headed arrows) to the copy of the third object in the free region 114. And as the second object 110 is being marked, the third object may be undergoing a third stage of evacuation, e.g., re-referencing any references to the third object in the evacuation region 112 by pointing the references to the copy of the third object in the free region 114 instead of to the third object in the evacuation region 112. Then, while the second object 110 is being copied to the free region 114, the third object may be added to a work queue 116. In some examples, the evacuation steps of pointing the forwarding pointer and the re-referencing may be performed concurrently as well. For example, the second object's 110 forwarding pointer may be updated to point to the copy 110' of the second object while the references of the second object 110 are being updated to point to the copy 110' of the second object in the free region 114 instead of to the second object 110 in the evacuation region 112. While the concurrent identifying, marking, and evacuating discussed here is with respect to a limited number of objects and to a limited number of combinations in the interest of clarity and brevity, such concurrent identifying, marking, and evacuating may be performed with any number of objects, and in any permutation or combination with respect to one or more objects.

Further, the garbage collector may selectively copy only the live objects which have forwarding pointers pointing to the live objects themselves or which do not presently have forwarding pointers pointing to objects in free regions. Thus, the evacuation process may include: 1) making a copy of the live objects which have forwarding pointers pointing to the live objects themselves or which do not presently have forwarding pointers pointing to objects in free regions; 2) pointing forwarding pointers of those objects to the copies of those objects in the free regions; and 3) updating any references of objects pointing to those objects in the evacuation region to instead point to the copies of those objects in the free region.

In the example shown in FIG. 1, the garbage collector is both concurrently marking and evacuating live objects and selectively evacuating only the live objects which have forwarding pointers pointing to the live objects themselves. To illustrate, notice that object 108, while a live object, is not being copied because its forwarding pointer is pointing elsewhere (perhaps to another object in a free region). By contrast, object 110 is being copied because its forwarding pointer is pointing to itself, which indicates that object 110 had not been previously copied (since under a normal evacuation, an object would be copied and its forwarding pointers should have been updated to point to the copy). Where an evacuation is interrupted, such as may be the case with object 108 (shown by its having both a forwarding pointer to another region while retaining a reference pointing to itself rather than to an object in the forwarding region), the garbage collector may use the forwarding pointer to determine the object to which the references should be updated. In such situations or others where forwarding pointers need to be updated, atomic compare and swap may be used to update the forwarding pointers, such that if multiple garbage collector and mutator threads were competing to move the same object, only one would succeed.

In some examples, the evacuated memory object or the memory object to be evacuated is concurrently placed into the work queue 116 before, during, or after the evacuation. The work queue 116 may include several sub-work queues, such as a first sub-work queue to schedule tasks for the current garbage collection cycle, and a second sub-work queue to schedule tasks for a future garbage collection cycle. Thus, a memory object, such as memory object 110, may be placed into a sub-work queue for processing in the next garbage collection cycle, for example, after memory object 110 has been successfully evacuated. In other examples, the object may be placed into the work queue while the evacuation is ongoing so as not to delay the beginning of the next garbage collection phase of re-scanning the garbage collection roots. In further examples, the object may be placed into the work queue after it is marked live and before evacuation begins.

Figure 2:
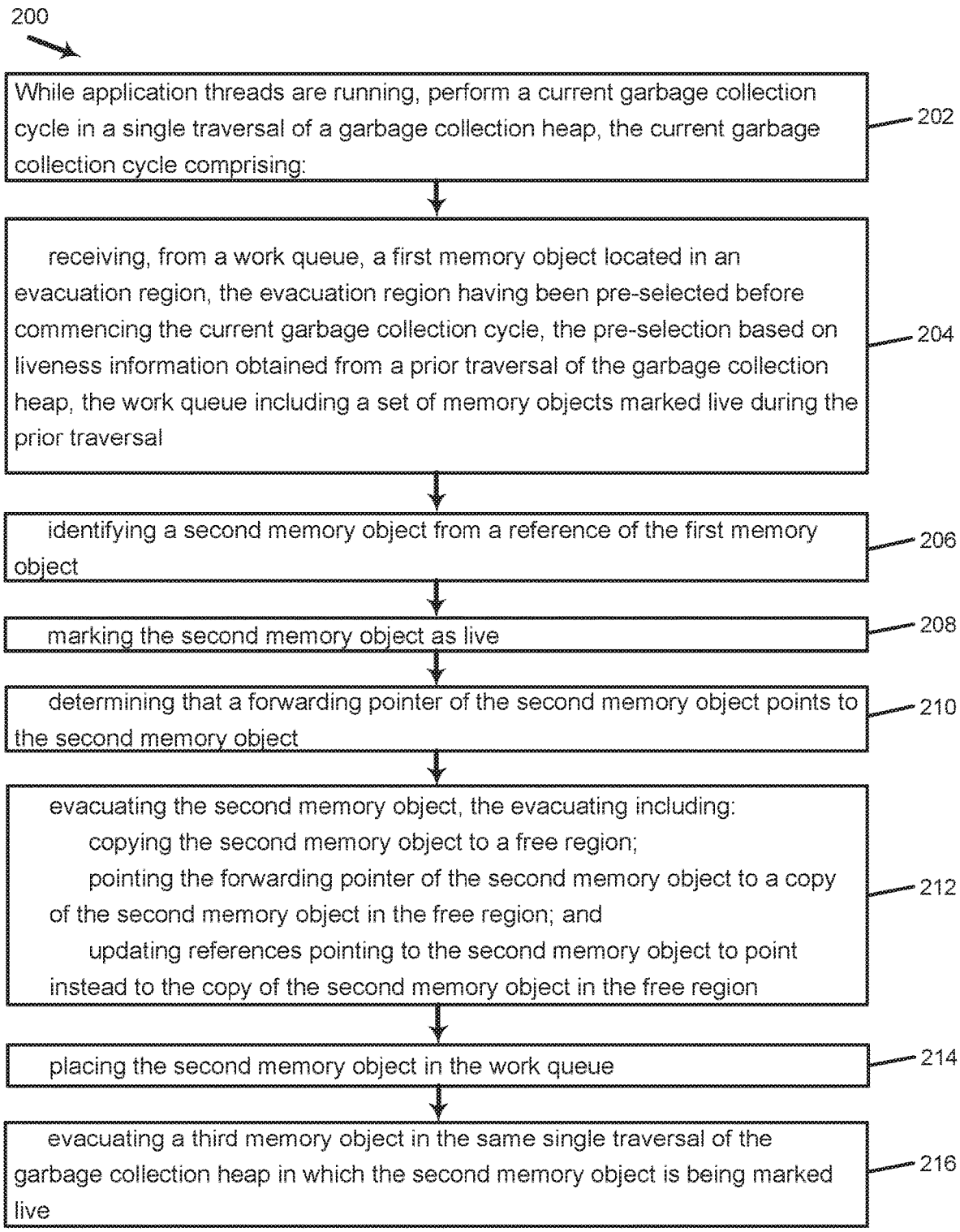
FIG. 2 is a flow diagram illustrating a method to perform concurrent garbage collection while application threads are running, in accordance with various examples of the present disclosure.

FIG. 2 is a flow diagram illustrating a method 200 to perform concurrent garbage collection while application threads are running, in accordance with various examples of the present disclosure. Method 200 may be performed by executing computer-readable instructions that are stored in memory 102 using one or more hardware processors 104 described with respect to FIG. 1. Additional actions may be provided before, during, and after the steps of method 200, and some of the actions described may be replaced, eliminated and/or re-ordered for other examples of the method 200. For example, method 200 may be performed in conjunction with systems 100, 300, and 400 described with respect to FIGS. 1, 3, and 4.

At action 202, a garbage collection cycle is performed while application threads are running. In some examples, the garbage collector may complete a garbage collection cycle using only one traversal of the heap while the application is running. The garbage collection cycle may comprise of several tasks or actions including one or more of those described below with respect to actions 204-216.

At action 204, a first memory object is received from a work queue. The memory object received from the work queue may be an object referenced by garbage collection roots located in a region of memory accessible by a garbage collector. In some examples, the first memory object is located is an evacuation region, such as earlier described with respect to object 108 and evacuation region 112 of FIG. 1. In some examples, the evacuation region is pre-selected prior to commencing the current garbage collection cycle. The pre-selection may be based on liveness information obtained from a prior traversal of the garbage collection heap. As described with respect to FIG. 1 and elsewhere, the evacuation region may be pre-selected because a liveness threshold was met in the previous garbage collection cycle, or is predicted to be met in the current garbage collection cycle. Thus, the garbage collector does not need to wait until marking is complete to calculate a current liveness of the region for it to decide whether a region is an evacuation region or not. As such, by using pre-selected evacuation regions, the garbage collector may concurrently mark and evacuate objects in the pre-selected evacuation region.

The work queue may include a set of memory objects marked live during a prior traversal of the garbage collection heap. A traversal of the garbage collection heap may include one or more of: a scanning phase while application threads are paused; a concurrent garbage collection cycle similar to the one being described here in FIG. 2 while application threads are running; and a re-scanning phase while application threads are paused. For example, as described with respect to FIG. 3, the garbage collector may scan the garbage collection roots while the application threads are paused. In some examples, while the application threads are still paused, the garbage collector may trace the objects referenced by the garbage collection roots. The traced objects may then be marked live and added to a work queue for further processing by the garbage collection processes while the application threads are running. After the traced objects are added to the work queue, the application may be unpaused. In other examples, to minimize pause times, once the roots have been scanned, the application threads are resumed, with tracing continuing while the application threads are running. In both examples, tracing may include visiting each reference of the roots (e.g., thread stacks). The rest of the garbage collection cycle processes of marking, evacuating, and queuing objects may proceed in the same way for root-traced objects as for other objects, such as for object 108 described with respect to FIG. 1. A traversal of the garbage collection heap may conclude with a final scanning of the garbage collection roots to capture any objects that were referenced only by the roots. Likewise, those may be marked live, evacuated, and added to the work queue. Thus, the work queue for the current garbage collection cycle may include objects that were marked live during a prior scanning phase while the application threads were paused or during a prior garbage collection cycle while the application threads were running.

At action 206, while application threads are running, a second memory object is identified from a reference of the first memory object. Just as how each reference of the root may be traced to identify objects referenced by the roots, subsequent objects may also be traced from references of other objects. For example, the garbage collector may visit each reference field of the first object to find a second object referenced by the first object.

At action 208, while application threads are running, the second memory object may be marked live. In addition, in some examples, the marking of a memory object as live may trigger a write blocker to block writes to the live memory object. In other examples, the copying of a memory object from an evacuation region to a free region may trigger the write blocker. This is to ensure that writes are performed only to objects in free regions. Thus, in some examples, writes to the "second object" (actually, the copy of the second object) may resume after the second object has been copied to the free region and after the forwarding pointer of the second object has been updated, e.g., by atomic compare-and-swap, to point to the copy of the second object in the free region. In more detail about the forwarding pointer, the forwarding pointer may be an additional word introduced into the object's header which is located directly preceding the object and is only allocated when using the disclosed garbage collector. Thus, all reads from and writes to the second object will now refer to the forwarded copy via the forwarding pointer.

At action 210, while application threads are running, a determination is made that a forwarding pointer of the second memory object points to itself, i.e., to the second memory object.

At action 212, while the application threads are running, memory objects that have been marked live and have forwarding pointers that point to the objects themselves are evacuated. In some examples, memory objects that have been marked live and that have forwarding pointers that do not point to objects in free regions are also evacuated. Since the second memory object has been marked live and has forwarding pointers pointing to itself, the second memory object may be evacuated.

To evacuate the second memory object, the second memory object may be copied to a free region. Then, the forwarding pointer of the second memory object may be updated to point to the copy of the second memory object in the free region. Any references pointing to the second memory object in the evacuation region may be updated to point to the copy of the second memory object in the free region. The updating of the forwarding pointer and the updating of the references may be performed concurrently.

At action 214, while application threads are running, the second memory object is placed in the work queue. As earlier explained with respect to FIG. 1, in some examples the placement of the second memory object in the work queue may occur before, during, or after the evacuation at action 212.

At action 216, while the application threads are running, a third memory object is evacuated while the second memory object is being marked live. As earlier explained with respect to FIG. 1, the concurrent evacuation of the third memory object with the marking of the second memory object is just one example of how garbage collection tasks may be concurrently performed in the same memory region. Any permutation or combination or garbage collection tasks—to the extent that they do not strictly rely on the completion of a prior garbage collection task—can substitute for the particular combination of concurrent evacuating and marking described here. In addition, in some examples, concurrency may also be achieved with respect to the same object. For example, while the application threads are running, the second memory object may concurrently be marked live and evacuated while the third memory object is also concurrently being evacuated. Generally, concurrency means that the start and finish of one action overlaps with the start and finish of another action.

As with the actions described with respect to FIG. 1, the actions described with respect to method 200 are scalable to any number of objects, and the concurrencies of the actions are not limited to the permutations or combinations described in method 200. Additional actions may be performed in conjunction with method 200. For example, during a garbage collection cycle, garbage collection processes may update references to point to new objects. If an application thread modifies a field, the thread may store an evacuation region reference to the field after the garbage collection workers have already visited that field. This would lead to references pointing to evacuation region objects. In some examples, such evacuation regions may be long-lived objects that are normally not evacuation candidates. But in order to avoid breaking the reference when the evacuation region is later reclaimed, the referenced evacuation region object may also be evacuated to a free region.

Figure 3:
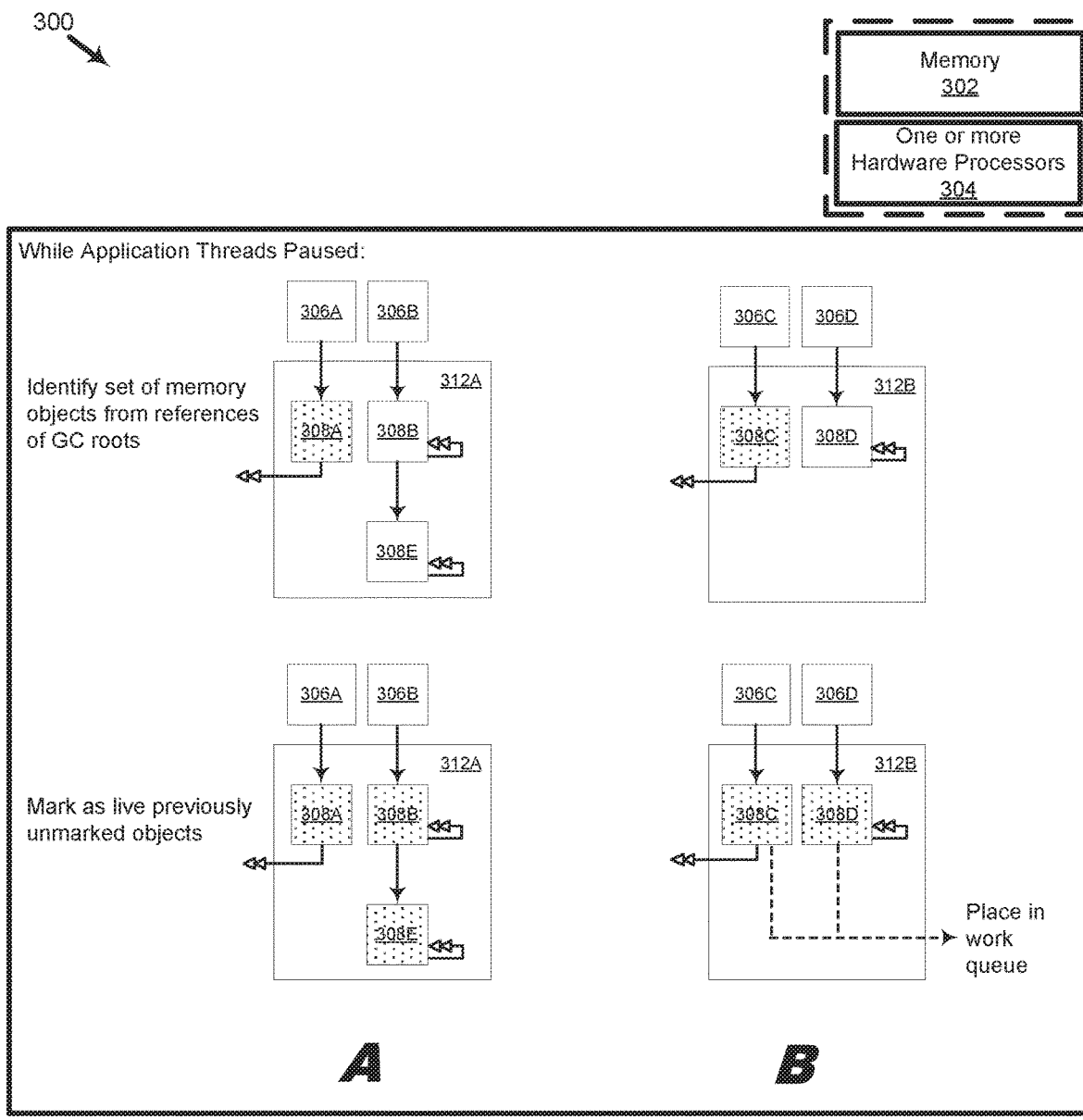
FIG. 3 is an organizational diagram illustrating a system to identify and mark objects while application threads are paused, in accordance with various examples of the present disclosure.

FIG. 3 is an organizational diagram illustrating a system 300 to identify and mark objects while application threads are paused, in accordance with various examples of the present disclosure. System 300 includes memory 302 and one or more hardware processors 304 similar to those described with respect to FIG. 1. The one or more hardware processors 304 execute instructions for performing the operations, steps, and actions discussed herein. The memory 302 may be structured to store garbage collection (GC) roots 306A, 306B, 306C, and 306D, a set of memory objects 308A, 308B, 308C, 308D, and 308E, and evacuation regions 312A and 312B.

In Example A, the identified memory objects, 308A and 308B, are separated by one degree of separation from the roots 306A and 306B, while object 308E is separated by two degrees of separation from the root 306B and not reachable from the root 306A. Objects which are separated from the roots by one degree of separation may be said to be directly referenced by the roots. While only two degrees of separation are shown in Example A, objects may be separated by more than two degrees of separation. Example A also shows how previously unmarked objects may be marked. For example, even though objects 308A, 308B, and 308E are all live objects, only objects 308B and 308E will need to be marked as live during the current traversal. This is because object 308A already contains a live marking from a prior traversal. Also, each of the objects 308A, 308B, and 308E include forwarding pointers. The forwarding pointer of object 308A points to another region, while the forwarding pointers of 308B and 308E point to themselves.

Example B shows the identification of memory objects that are directly referenced by 306C and 306D. Example B, like Example A, also shows how previously unmarked objects may be marked. In Example B, only object 308D is marked, since object 308C had been previously marked in a prior traversal. Unlike in Example A, no further references are traced from objects 308C and 308D while the application threads are paused. Instead, in Example B, the objects 308C and 308D are placed in work queues after they have been marked.

Further tracing, to the extent that it is required, may be conducted when the objects 308C and 308D are retrieved from the work queue while the application threads are running. By performing fewer actions while the application threads are paused, the duration of such pauses may be reduced to a bare minimum. To further shorten the pause, the marking of objects while the application threads are paused may be omitted entirely. Instead, once an object has been traced from the roots, the object may be added to the work queue without having been marked. The object may be marked when it is retrieved from the work queue, while the application threads are running.

Figure 4:
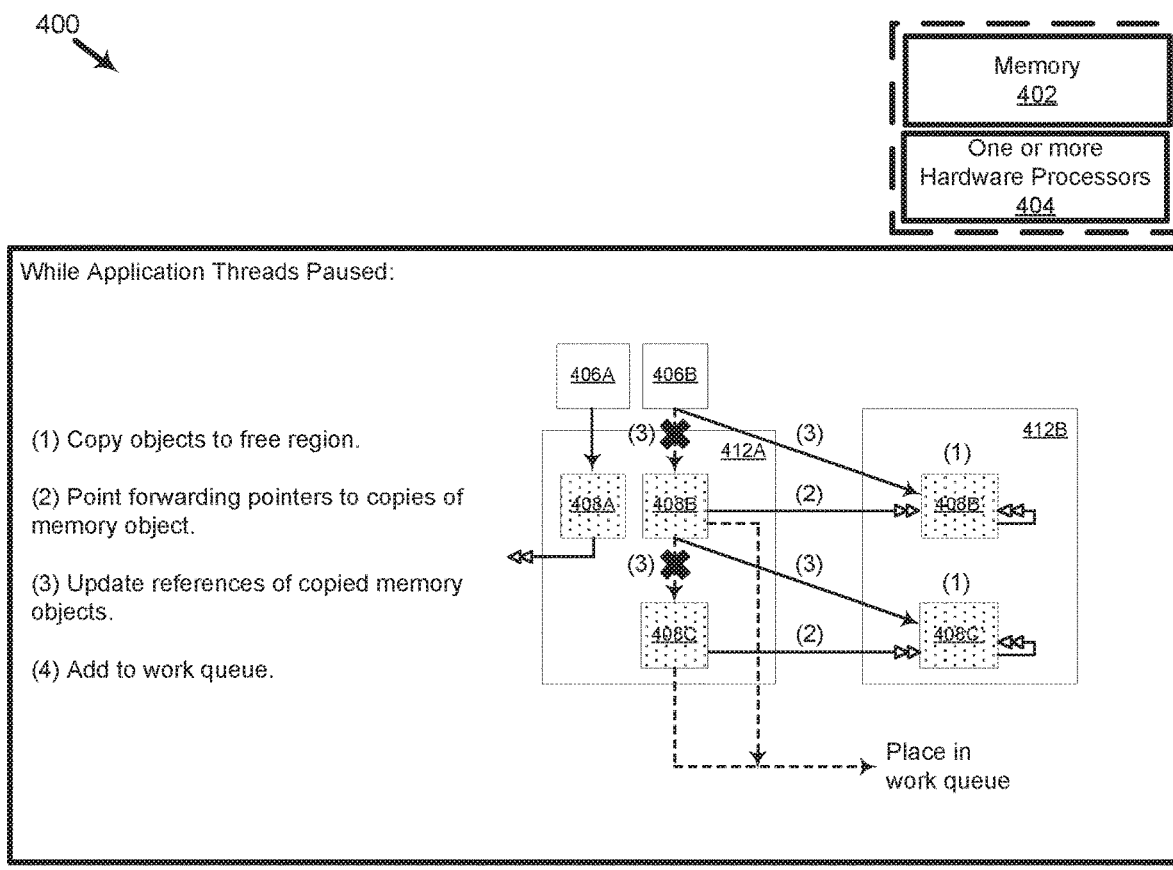
FIG. 4 is an organizational diagram illustrating a system to evacuate objects while application threads are paused, in accordance with various examples of the present disclosure.

FIG. 4 is an organizational diagram illustrating a system 400 to evacuate objects while application threads are paused, in accordance with various examples of the present disclosure. System 400 includes memory 402 and one or more hardware processors 404 similar to those described with respect to FIG. 1. The one or more hardware processors 404 execute instructions for performing the operations, steps, and actions discussed herein. The memory 302 may be structured to store garbage collection (GC) roots 406A and 406B, a set of memory objects 408A, 408B, 408B', 408C, and 408C', evacuation region 412A, and free region 412B.

In addition to tracing and marking objects while the application threads are paused as described with respect to FIG. 3, the garbage collector may also evacuate objects while the application threads are paused. The process for evacuating objects while the application threads are paused is similar to the process for evacuating objects while the application threads are running. For example, the garbage collector may selectively evacuate only those objects which are not previously marked live and do not have forwarding pointers pointing to free regions. Here, objects 408A, 408B, and 408C are all live, since they are reachable from the roots 406A and 406B. However, 408A will not be evacuated, since 408A, like 308A, was previously marked live, and also has a forwarding pointer that points to a free region (not shown, but see object 308A in FIG. 3). On the other hand, 408B and 408C will be evacuated, since they have forwarding pointers that point back to themselves (not shown, but see objects 308B and 308E in FIG. 3).

To evacuate objects 408B and 408C, objects 408B and 408C may be copied from the evacuation region 412A to a free region 412B. Then, the forwarding pointers of the copied objects 408B and 408C may be updated to point to their copies 408B' and 408C' respectively. Before, during, or after the forwarding pointers have been updated, any references pointing to the copied objects 408B and 408C in the evacuation region 412A may be updated to point instead to the copies 408B' and 408C' in the free region 412B. For example, the reference from root 406B pointing to 408B may be deleted, and a new reference from root 406B pointing to 408B' may be installed in its place. Similarly, the reference from 408B to 408C may be removed and replaced with a reference from 408B to 408C'. The re-referencing ensures that when the evacuation region is reclaimed after the garbage collection cycle, the contents of the objects 408B and 408C are still reachable by the root 406B and the object 408B respectively via their copies 408B' and 408C'. In the interim between the evacuation of 408B and 408C and the reclamation of the evacuation region 412A, the forwarding pointers ensure that any reads or writes to objects 408B and 408C will be forwarded to 408B' and 408C'. Objects 408B and 408C may be added to a work queue before, during, or after their evacuation.

Thus, not only may the actions and configurations described in FIGS. 3 and 4 be combined with each other, they may also be combined with FIG. 1. For example, while the application threads are paused, objects may be traced from root references and marked live in accordance with FIG. 3. While the application threads are still paused, the objects may then be copied, forwarded, re-referenced, and added into a work queue in accordance with FIG. 4. The application threads may then be unpaused, and further objects traced or identified from the objects earlier placed into the work queue. While the application threads are running, the identified objects may then be concurrently copied, forwarded, re-referenced, and placed into a work queue in accordance with FIGS. 1 and 2. Next, the application threads may be paused for a second and final time to trace the root references once again, for example, in accordance with the techniques described in Example B of FIG. 3. In some examples, the second pause-and-scan may be used to catch any unmarked objects that were added by the application threads while the application was running, and which are only referenced by the roots. If any objects are found at this stage, they may be marked live and added to a work queue for processing in a future garbage collection cycle, or they may be marked live and evacuated in the current garbage collection cycle. Finally, the evacuation regions may be reclaimed, and prepared for use in future allocations.

Figure 5:
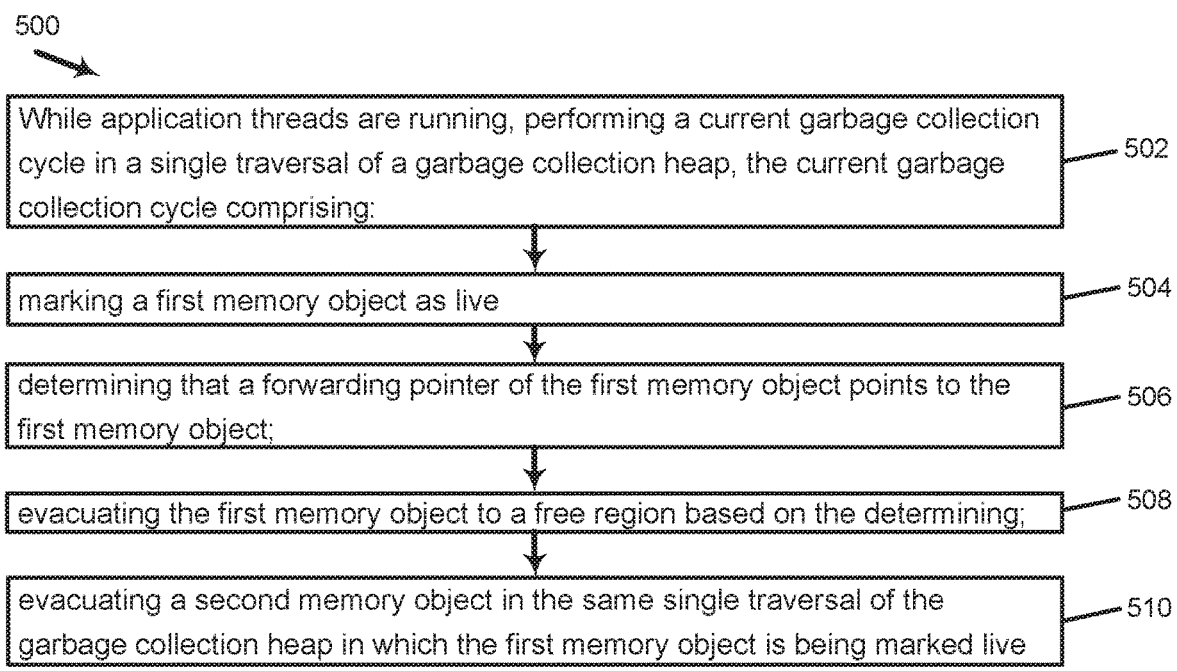
FIG. 5 is a flow diagram illustrating a method to perform concurrent garbage collection while application threads are running, in accordance with various examples of the present disclosure.

FIG. 5 is a flow diagram illustrating a method to perform concurrent garbage collection while application threads are running, in accordance with various examples of the present disclosure. Method 500 may be performed by executing computer-readable instructions that are stored in memory 102 using one or more hardware processors 104 described with respect to FIG. 1. Additional actions may be provided before, during, and after the steps of method 500, and some of the actions described may be replaced, eliminated and/or re-ordered for other examples of the method 500. For example, method 500 may be performed in conjunction with method 200 and systems 100, 300, and 400 described with respect to FIGS. 1, 3, and 4.

At action 502, a garbage collection cycle is performed while application threads are running. In some examples, the garbage collector may require only a single traversal of the heap to complete a garbage collection cycle, and the garbage collection cycle may be performed as the application is running. The garbage collection cycle may comprise of several tasks or actions such as those described below with respect to actions 504-510.

At action 504, while application threads are running, a first memory object is marked live. In some examples, the first memory object may be an object that is referenced by another object loaded from a work queue. The object loaded from the work queue may in turn be referenced by the garbage collection roots or by other objects. In some examples, the loaded object may have previously been marked live in a prior traversal of the garbage collection heap. In some examples, the loaded object will not have been previously marked live. Thus, in such examples, the first memory object may refer to the object loaded from the work queue. In other examples, the first memory object may refer to an unmarked object referenced by the object loaded from the work queue.

Like described with respect to action 204, the first memory object may be located in an evacuation region. The evacuation region may have been pre-selected before commencing the current garbage collection cycle. The pre-selection may be based on liveness information from a prior traversal of the garbage collection heap. In some examples, liveness information is obtained or derived from the immediately preceding garbage collection cycle. In some examples, liveness information is obtained or derived from an older garbage collection cycle.

At action 506, while application threads are running, a forwarding pointer of the first memory object is determined to point to the first memory object itself. In some examples, all memory objects under the current garbage collection scheme include a forwarding pointer. The forwarding pointer may begin pointing to the object itself, but may be re-directed to point to other objects in the same or other regions.

At action 508, while application threads are running, the first memory object is evacuated to a free region based on the determination that the forwarding pointer of the first memory object points to the first memory object itself. In some examples, the evacuation includes copying the first memory object to a free region similar to the copying described in earlier examples. In some examples, the evacuation may also include updating the forwarding pointer of the first memory object to point to the copy of the first object in the free region instead of to the first memory object in the evacuation region, in similar fashion as described with respect to earlier examples. In some examples, the evacuation may also include updating the references of objects pointing to the first memory object in the evacuation region to instead point to the copy of the first memory object in the free region using techniques described with respect to earlier examples. In some examples, the first memory object is also placed into a work queue before, during, or after the evacuation using earlier-described techniques.

At action 510, while application threads are running, a second memory object is evacuated during the same single traversal of the garbage collection heap in which the first memory object is being marked live. In other words, the second memory object is being evacuated concurrently to the marking of the first memory object. While the concurrent marking and evacuating are occurring, other concurrent tasks may also be performed by other garbage collection threads with respect to the first and second objects or with respect to other objects in the same evacuation region that the first and second objects are in as the heap is being traversed. In some examples, concurrent tasks are also being performed across multiple regions by multiple garbage collection workers.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method comprising:
    while application threads are running, performing a current garbage collection cycle in a single traversal of a garbage collection heap, the current garbage collection cycle comprising:
        marking a first memory object as live;
        determining that a forwarding pointer of the first memory object points to the first memory object, wherein the pointing to the first memory object indicates that the first memory object has not been copied;
        evacuating the first memory object to a free region based on the determining; and
        evacuating a second memory object in the same single traversal of the garbage collection heap in which the first memory object is being marked live.

2. The method of claim 1, wherein the first memory object is identified from an object received from a work queue.

3. The method of claim 2, wherein the object received from the work queue is a live object.

4. The method of claim 3, wherein the live object that is received from the work queue was marked live during a prior traversal of the garbage collection heap.

5. The method of claim 4, wherein the prior traversal comprises:
    identifying a set of memory objects from references of the garbage collection roots; and
    marking previously unmarked objects of the set of memory objects as live.

6. The method of claim 5, wherein the prior traversal of the garbage collection roots further comprises:
    for the marked objects in the set of memory objects that are in an evacuation region and that have forwarding pointers pointing to the marked objects in the set of memory objects:
        copying the marked objects in the set of memory objects to the free region;
        pointing the forwarding pointers of the marked objects in the set of memory objects in the evacuation region to copies of the marked objects in the free region;
        updating the references pointing from the garbage collection roots to the marked objects to point instead to the copies of the marked objects in the free region; and
        placing the marked objects in the work queue.

7. The method of claim 1, wherein the first memory object is in an evacuation region.

8. The method of claim 7, wherein the evacuation region is pre-selected before commencing the current garbage collection cycle.

9. The method of claim 8, wherein the pre-selection is based on liveness information obtained during a prior traversal of the garbage collection heap.

10. The method of claim 1, wherein the evacuating the first memory object comprises:
    copying the first memory object to the free region;
    pointing the forwarding pointer of the first memory object to a copy of the first memory object in the free region; and
    updating references pointing to the first memory object to point instead to the copy of the first memory object in the free region.

11. A non-transitory machine-readable medium having stored thereon machine-readable instructions executable to cause a machine to perform operations comprising:
    while application threads are running, performing garbage collection of a running application in a single traversal of a garbage collection heap wherein the following steps are performed concurrently with one another:
        receiving, from a work queue, memory objects located in an evacuation region, the evacuation region being pre-selected based on liveness information obtained from a prior traversal of the garbage collection heap;
        marking the identified memory objects as live;
        determining that forwarding pointers of the marked memory objects point to the marked memory objects, wherein the pointing to the marked memory objects indicate that the marked memory objects have not been copied;
        copying the marked memory objects in the evacuation region to a free region;
        pointing the forwarding pointers of the marked memory objects to the copies of the marked memory objects in the free region;
        updating the references pointing to the copied memory objects in the evacuation region to point instead to the copies of the copied memory objects in the free region;
        placing the marked memory objects in the work queue.

12. The non-transitory machine-readable medium of claim 11, wherein the evacuation region is further selected based on an amount of live data within that region being less than a threshold amount.

13. The non-transitory machine-readable medium of claim 11, wherein the selection of the evacuation region is further based on a predicted liveness.

14. The non-transitory machine-readable medium of claim 11, further comprising reclaiming the evacuation region.

15. A system comprising:
a non-transitory memory storing a code coverage module;
one or more hardware processors coupled to the non-transitory memory and that execute instructions to cause the system to perform operations comprising:
  while application threads are running, performing a current garbage collection cycle in a single traversal of a garbage collection heap, the current garbage collection cycle comprising:
    marking a first memory object as live;
    determining that a forwarding pointer of the first memory object points to the first memory object, wherein the pointing to the first memory object indicates that the first memory object has not been copied;
    evacuating the first memory object to a free region based on the determining; and
    evacuating a second memory object in the same single traversal of the garbage collection heap in which the first memory object is being marked live.

16. The system of claim 15, further comprising traversing the garbage collection roots after the current garbage collection cycle to capture any unmarked memory objects referenced only by garbage collection roots.

17. The system of claim 15, wherein the first memory object is in a region that had been allocated for use after a prior garbage collection cycle.

18. The system of claim 15, wherein the first memory object is in a region that includes unmarked memory objects introduced into the allocated region for the first time after the prior garbage collection cycle.

19. The system of claim 15, further comprising placing the first memory object or the second memory object in a work queue in response to a modification to references which point to the first memory object or the second memory object.

20. The system of claim 15, further comprising:
  blocking a write to the first memory object after the first memory object has been marked live; and
  permitting the write after the first memory object has been copied to the free region and after the forwarding pointer of the first memory object has been pointed to the free region, wherein the write results in a write to the copy of the first memory object in the free region instead of the first memory object.

21. The system of claim 15, further comprising:
  evacuating a third memory object in response to a creation of a new reference pointing to the third memory object, or in response to a modification of an existing reference which causes the existing reference to point to the third memory object, wherein the creation of the new reference or the modification of the existing reference occurs after the existing reference had been traversed, and wherein the evacuating comprises:
    copying the third memory object to the free region;
    pointing a forwarding pointer of the third memory object to the copy of the third memory object in the free region;
    updating references pointing to the third memory object in the evacuation region to point instead to the copy of the third memory object in the free region; and
    placing the third memory object in a work queue.

* * * * *